US010352089B1

(12) United States Patent
Lawrence

(10) Patent No.: US 10,352,089 B1
(45) Date of Patent: Jul. 16, 2019

(54) JAMB ADJUSTER

(71) Applicant: Barry G. Lawrence, Thomasville, NC (US)

(72) Inventor: Barry G. Lawrence, Thomasville, NC (US)

( * ) Notice: Subject to any disclaimer, the term of this patent is extended or adjusted under 35 U.S.C. 154(b) by 202 days.

(21) Appl. No.: 15/355,788

(22) Filed: Nov. 18, 2016

(51) Int. Cl.
E06B 1/60 (2006.01)
F16B 37/12 (2006.01)
F16B 25/00 (2006.01)

(52) U.S. Cl.
CPC ........ *E06B 1/6076* (2013.01); *F16B 25/0078* (2013.01); *F16B 37/127* (2013.01)

(58) Field of Classification Search
CPC .. E06B 1/6015; E06B 1/6076; F16B 25/0078; F16B 37/127
See application file for complete search history.

(56) References Cited

U.S. PATENT DOCUMENTS

| 2,595,506 | A | * | 5/1952 | Backman | E06B 1/18 16/246 |
| 3,752,030 | A | * | 8/1973 | Steurer | F16B 25/0021 411/411 |
| 4,486,134 | A | * | 12/1984 | White | F16B 5/0283 411/103 |
| 5,174,703 | A | * | 12/1992 | White | E04F 13/0807 411/107 |
| 5,361,478 | A | * | 11/1994 | Grossberndt | B21J 5/066 29/432 |
| 6,167,663 | B1 | * | 1/2001 | Nakamoto | E06B 1/10 411/366.1 |
| 6,874,286 | B2 | * | 4/2005 | Tavivian | E06B 1/02 49/505 |
| 8,348,572 | B2 | * | 1/2013 | Friederich | F16B 25/0021 411/386 |
| 8,806,812 | B2 | * | 8/2014 | Kolovich | E06B 1/12 52/126.1 |
| 9,194,170 | B2 | * | 11/2015 | Eis | E06B 1/603 |
| 9,926,736 | B2 | * | 3/2018 | Clarke, Jr. | E06B 1/6076 |
| 2008/0226420 | A1 | * | 9/2008 | Huang | E06B 1/603 411/352 |

FOREIGN PATENT DOCUMENTS

WO    WO-2009134188 A1 * 11/2009 ........... E06B 1/6076

* cited by examiner

*Primary Examiner* — Catherine A Kelly
(74) *Attorney, Agent, or Firm* — Tuggle Duggins P.A.; Blake Hurt

(57) ABSTRACT

A jack screw-type fastener with a head defining an interior aperture with a Phillips pattern in the top and in communication with a central channel sized and shaped to receive a fastener therethrough for structurally reinforcing the window jamb of a window frame. The jamb adjuster includes a series of oversized and narrowly oriented threads relative to commercially available threaded fasteners (about 50% larger than average), frictionally engaging a greater ratio of the window frame wall depth than conventional. In use, the jamb adjuster is a self-tapping screw member that renders unnecessary a receiver, reducing component cost and structural degradation, and instead displacing a portion of the window frame material, for example vinyl, during insertion, causing a more structurally secure attachment to the window frame. The jamb adjuster also provides a more robust attachment mechanism for vital weather stripping than other fasteners or adhesive as known in the art.

9 Claims, 2 Drawing Sheets

JAMB ADJUSTER

FIELD OF THE INVENTION

The invention herein pertains to window hardware and particularly pertains to an adjustable screw for the prevention of window frame bowing under environmental duress.

DESCRIPTION OF THE PRIOR ART AND OBJECTIVES OF THE INVENTION

Conventional fasteners have long been used to adjust the bowing of window frames and to connect weather stripping to the interior surface of window frames facing the sash during window installation or replacement. Before or after insertion of the window frame into a rough opening, weather stripping may be applied to the inward-facing (i.e. sash facing) surface of the window frame to prevent leaks, drafts, and other environmental weather elements that are desired to be kept outside of a structure. The stripping may include adhesive to affix to the window frame, but many installers also rely on mechanical fasteners to attach the weather stripping to the window frame. The problem with mechanical fasteners, and specifically with reference to threaded fasteners in this role, is that the window frame wall depth available to anchor the fasteners is minimal, and thus ill-suited to provide a robust attachment surface for weather stripping. As such, mechanical receivers are often inserted into the window frame to provide a threaded surface to receive threaded fasteners therein. These receivers may be installed along the longitudinal length of the window frame, but this process leads to numerous holes in the long side of the window frame, resulting in a structurally weakened window, particularly with respect to bowing in the window jamb, which exacerbates the very problem the use of these fasteners and receivers purport to solve.

Thus, in view of the problems and disadvantages associated with prior art attachment devices and methods, the present invention was conceived and one of its objectives is to provide a jamb adjuster that does not require an additional receiver.

It is another objective of the present invention to provide a jamb adjuster that is self-tapping into the wall of the window frame.

It is still another objective of the present invention to provide a jamb adjuster that defines a central channel for the passage of a threaded fastener therethrough.

It is yet another objective of the present invention to provide a jamb adjuster that includes a head defining a width of at least an eighth of an inch (0.125"), and preferably a width of three sixteenths of an inch (0.187").

It is a further objective of the present invention to provide a jamb adjuster that has a length that prevents a threaded fastener from passing into the window jamb, and preferably defines a length of about twenty-five thirty-seconds of an inch (0.787").

It is still a further objective of the present invention to provide a jamb adjuster with a head width that accommodates for the depth of the window jamb groove, such that any additional hardware such as a threaded fastener is kept out of, or prevented from, penetrating the window jamb groove and any associated hardware, for example balance shoes.

It is yet a further objective of the present invention to provide a jamb adjuster defining a plurality of oversized threads with a narrow alignment relative to conventional threaded fasteners, which serve to engage a greater ratio of the window frame wall in comparison to conventional threaded fasteners.

It is another objective of the present invention to provide a jamb adjuster that defines a head width of appropriate dimension, for example at least an eighth of an inch and preferably at least three eighths of an inch, to serve a shimming function, such that no additional shim member or structure is necessary for interior adjustment of the window frame.

Various other objectives and advantages of the present invention will become apparent to those skilled in the art as a more detailed description is set forth below.

SUMMARY OF THE INVENTION

The aforesaid and other objectives are realized by providing a jamb adjuster for inserting into the long side of the exterior of a replacement window frame. In the preferred embodiment, the jamb adjuster is a jack screw-type fastener with a head defining a width of approximately 0.430 of an inch and a thickness of approximately 0.187 of an inch, defining an interior aperture with a Phillips pattern in the top and in communication with a central channel sized and shaped to receive a fastener therethrough. The adjuster defines a length of 0.787 of an inch, with a plurality of oversized and narrowly oriented threads relative to commercially available threaded fasteners (about 50% larger in terms of diameter than average), frictionally engaging a greater ratio of the window frame wall depth than conventional. In use, the jamb adjuster is a self-tapping screw member that renders unnecessary a receiver, reducing component cost and structural degradation, and instead displaces a portion of the window frame material, for example vinyl, during insertion, causing a more structurally secure attachment to the window frame.

DETAILED DESCRIPTION OF THE PREFERRED EMBODIMENT AND OPERATION OF THE INVENTION

Figure 1:
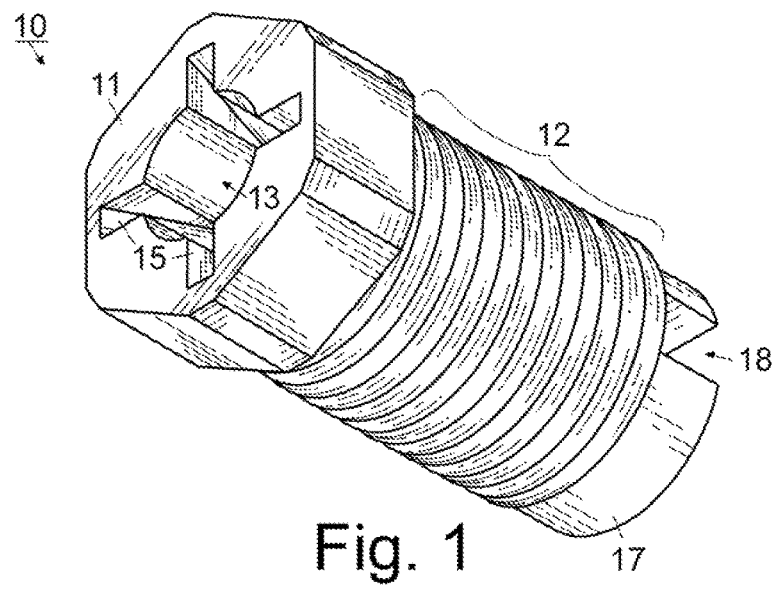
FIG. 1 shows an elevated perspective view of a jamb adjuster.
Figure 2:
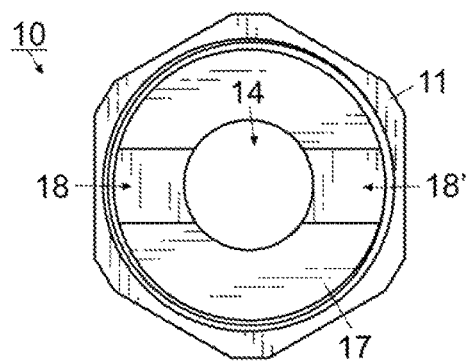
FIG. 2 pictures an elevated side view of the jamb adjuster of FIG. 1.
Figure 3:
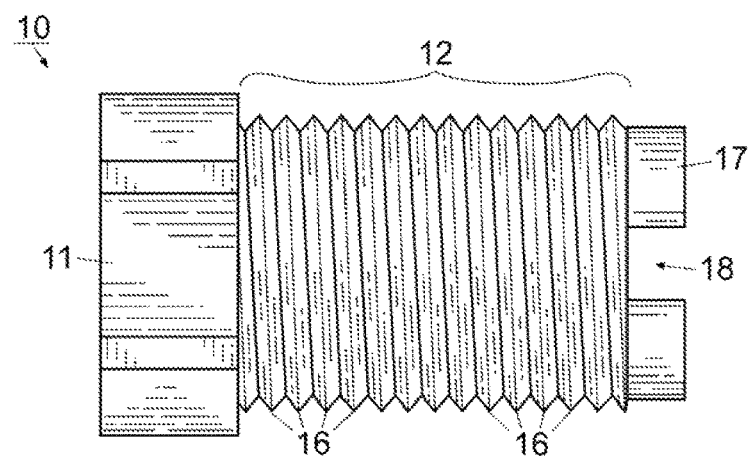
FIG. 3 depicts a top plan view of the jamb adjuster of FIG. 1.

For a better understanding of the invention and its operation, turning now to the drawings, FIGS. 1-3 illustrate perspective, side, and top views of jamb adjuster 10. While it is understood that the term "jamb adjuster" may encompass any member that is inserted proximate a window frame to prevent the bowing of the longitudinal channel typically referred to as the window jamb, its use in the instant disclosure is focused on a threaded member, preferably of unitary construction, that can engage the walls of a molded window frame to prevent bowing of the window jamb as well as aid in the attachment of window accessories such as weather stripping. Preferred jamb adjuster 10 includes head 11 and threaded body 12, both integrally formed from a rigid manufacturing material such as a polymeric material, for example nylon, polyvinyl chloride, polyethylene (high density, low density, or terephthalate derivatives included), polypropylene, or other know monomers and polymers as may be appropriate.

As demonstrated in FIGS. 1 and 3, preferred head 11 defines a generally hexagonal shape with a large central opening 13 in communication with interior channel 14 that extends substantially the longitudinal length of jamb adjuster 10. Opening 13 and channel 14 are sized and shaped to receive a conventional threaded fastener therein (not shown), for example a conventional metallic woodscrew, to provide additional structural support by anchoring such a fastener to the solid wood framing that typically defines a window opening in a structure (not shown). Head 11 also preferably defines a plurality of slits 15 (two marked in FIG. 1) extending radially outward from opening 13. Four slits 15, in combination with circular opening 13, combine to define a pattern on the surface of head 11 that is generally referred to as a Phillips pattern, and is convenient for installers to utilize in the insertion of jamb adjuster 10 as will be described in further detail below. The walls of slits 15 may be perpendicular to the surface of head 11, but an embodiment of slits 15 may define walls that angle inwardly as they descend within the depth of head 11, terminating at a shoulder within jamb adjuster 10 that defines a circumference less than the circumference defined by opening 13. This is particularly advantageous as it permits head 11 to accommodate a wide variety of standard drill bit sizes for insertion, but prevents unnecessary play in the spacing of inserted fasteners through channel 14, as their circumference are typically less than that of opening 13, resulting in a smaller spatial footprint in which to displace. Preferred head 11 defines a width of about three sixty-fourths of an inch (0.430" or 1.1 cm) and a thickness of about three-sixteenths of an inch (0.187" or 0.47 cm), and more preferably defines a width of three sixty-fourths of an inch (0.430" or 1.1 cm) and a thickness of three-sixteenths of an inch (0.187" or 0.47 cm).

As illustrated in FIGS. 1-3, preferred threaded body 12 is a generally cylindrical member with a series of threads 16 defined on the exterior surface thereof, threads that are formed in a continuous loop at an ascending, slightly angular plane. In the preferred embodiment, threads 16 cover about a half inch (0.523" or 1.33 cm) of the longitudinal length of threaded body 12, and more preferably cover a half inch (0.523" or 1.33 cm) of the longitudinal length of threaded body 12. Each thread is about one sixty-fourth of an inch (0.020" or 0.05 cm) tall off the surface of threaded body 12 and define an angled plane of about eighty degrees (80°), and more preferably define a height of one sixty-fourth of an inch (0.020" or 0.05 cm) and an angled plane of at least fifty degrees (50°), more preferably between sixty and eighty degrees)(60°-80° and most preferably sixty-two degrees (62°). A distance of about a thirty-seconds of an inch (0.037" or 0.09 cm) separate respective "peaks" of adjacent threads 16, and more preferably define a distance of a thirty-seconds of an inch (0.037" or 0.09 cm), indicating that the threads are angled steeply but positioned narrowly relative to the prior art. As used herein, the term "narrow" is intended to mean less than four-one hundredths of an inch apart (0.039" or 0.10 cm). These values are not to be considered mere design elements, as the specific sizing, spacing, orientation, and configuration of this embodiment of threads 16 results in an advantageous engagement in the operating environment, namely the engagement of a window frame side wall. The conventional width of a window frame side wall is approximately seventy thousandths of an inch (0.070" or 0.18 cm), and the conventional threaded fastener defines a thread pattern that permits only one to one and a half threads to engage the window frame material during installation. By comparison, preferred jamb adjuster 10, by virtue of the pattern of threads 16 defined in the exterior surface of threaded body 12, can engage the window frame side wall with three threads 16, or an increase of 50% over the conventional fasteners. This increase in engagement surface area results in a far more robust attachment than known in the prior art, and this increase is important in the act of preventing the bowing of the window jamb during typical use. An embodiment of threaded body 12 may further include unthreaded portion 17 and notches 18, 18' that ascend upwardly to interrupt a portion of threads 16. Notches 18, 18' may be engaged by a convention screwdriver, for example a flat-head screwdriver, to adjust the positioning of head 11 at the exterior of window frame 20, for example to obviate the need for an additional shimming member that is typically required in the prior art. Threaded body 12 preferably defines a diameter as measured to the outer edges of threads 16 as about four tenths of an inch (0.400" or 0.10 cm), and more preferably four tenths of an inch (0.400" or 0.10 cm).

Figure 4:
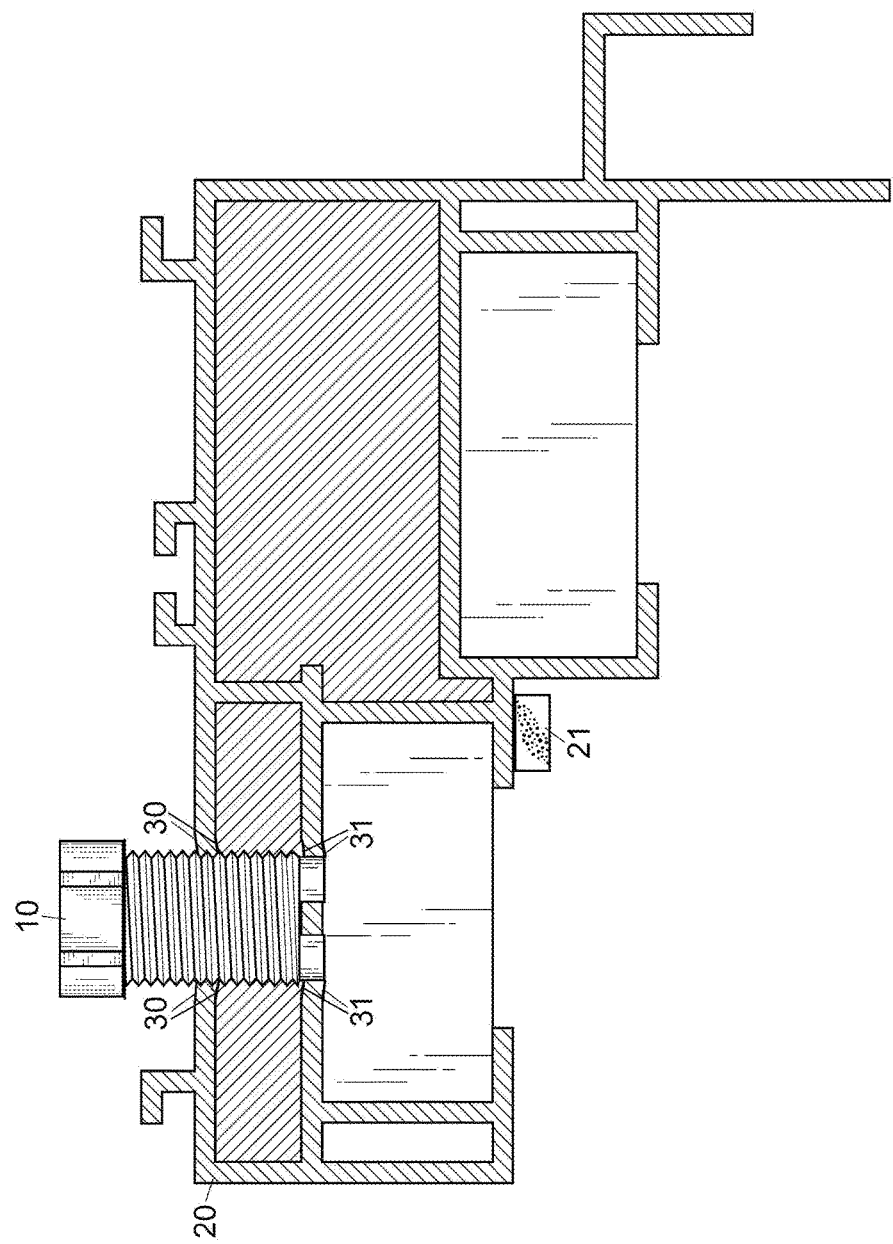
FIG. 4 demonstrates a top plan view of an environmental perspective of the jamb adjuster of FIG. 1, shown in a cross-sectioned double-hung window frame.

FIG. 4 is an environmental view of jamb adjuster 10 as deployed within window frame 20, viewed as a top plan view with window frame 20 cross-sectioned but jamb adjuster 10 in full form. As shown, weather stripping 21 is placed about the interior of window frame 20, for example to prevent moisture, air drafts, or other environmental indicia. As threaded body 12 is rotated into the side wall of window frame 20, threads 16 begin to frictional engage, and due to their size, shape, orientation, and configuration, threads 16 actually serve to displace a small amount of the material demonstrated as 30, 31 that forms window frame 20, for example thirty-thousandths of an inch (0.030" or 0.076 cm) inward instead of outward as is typical, which is significant considering the usual width of a window frame wall is only seventy thousandths of an inch (0.070" or 0.18 cm). In on embodiment, this frictional displacement of the window frame wall is accomplished with a softening (i.e. heating or melting) of the polymeric material, and results in a small amount of the displaced material 30, 31 being pushed ahead of the threads, thickening the side wall by up to about thirty-thousandths of an inch (0.030" or 0.076 cm). This displacement, coupled with the thread pattern of threads 16, serve to provide jamb adjuster 10 with additional anchoring purchase relative to conventional threaded fasteners. Specifically, jamb adjuster 10 has been determined to frictional engage window frame 20 with at least three threads 16, whereby conventional fasteners have been demonstrated to only be capable of engaging with one to one and a half threads. Jamb adjuster 10 then engages the opposing side wall, but terminates its screwing progress before protruding significantly into the jamb cavity as defined by window frame 20. In this manner, jamb adjuster 10 can serve its purposes to structurally reinforce window frame 20, and particularly the window jamb, against bowing, all without obstructing the window hardware that typically travels in the window jamb (for example, window balance shoes, vent stop holders, or the like). Further, the proper positioning of jamb adjuster 10 as described presents central channel 14 at the back wall of the jamb, whereby a conventional fastener (not shown) may be passed through and frictionally engage the wood frame surrounding the window opening in the structure, further providing structural support to the window generally and the jamb specifically from bowing or buckling. Additionally, by virtue of the positioning of head 11 relative to the exterior surface of window frame 20, jamb adjuster 10 may also serve a shimming function, as nearly all replacement windows require the use of a shim, for example one eighth, one quarter, or three eighths of an inch (0.125", 0.25", and 0.375", respectively) as standard practice is to order a window size that is slighter smaller than the surrounding opening for ease of installation. With the threaded jamb adjuster in place, the need for these additional shim members is obviated. For example, if modification needs to be made to jamb adjuster 10 to address bowing, a screwdriver may be used to turn jamb adjuster the desired direction via notches 18, 18', urging head 11 back against the wood that typically defines the rough opening (not shown), negating the need for a shim member (this process may be referred to as "jacking" jamb adjuster 10), solving the common problem of replacement windows being installed without proper shimming.

The illustrations and examples provided herein are for explanatory purposes and are not intended to limit the scope of the appended claims.

I claim:

1. A method of reinforcing a window jamb comprising the steps of
providing a jamb adjuster, the jamb adjuster comprising a single integral member formed from a head and a threaded body defining a plurality of threads positioned in a narrow configuration,
engaging a wall of a window frame with the threaded body,
displacing a portion of the wall of the window frame inwardly by rotation of the threaded body to increase the width of the wall of the window frame available to engage the jamb adjuster, and
frictionally engaging the wall of the window frame with at least two threads of the plurality of threads.

2. The method of claim 1 wherein the step of displacing a portion of the wall of the window frame comprises displacing 0.030 inches of material.

3. The method of claim 1 further comprising the step of receiving a threaded fastener within a channel defined by the jamb adjuster to prevent bowing of a window jamb defined by the window frame.

4. The method of claim 1 wherein the head defines a central opening, wherein the body defines an interior channel that extends substantially a longitudinal length of the jamb adjuster, and wherein the central opening and the interior channel are sized and shaped to receive a threaded fastener therein.

5. The method of claim 4 wherein the head further defines a plurality of slits in communication with the central opening.

6. The method of claim 5 wherein the slits and the central opening combine to define a Phillips pattern.

7. The method of claim 6 wherein the plurality of threads defines an angled plane of between sixty and eighty degrees (60°-80°).

8. The method of claim 7 further comprising the step of adjusting the position of the head of the jamb adjuster by engaging a notch defined in the threaded body, obviating the need for an additional shimming member.

9. The method of claim 8, wherein the notch extends laterally relative to a longitudinal length of the jamb adjuster.

* * * * *